United States Patent
Bräuer et al.

(10) Patent No.: US 6,930,163 B2
(45) Date of Patent: Aug. 16, 2005

(54) PROCESS FOR THE CONTINUOUS PREPARATION OF THERMOPLASTICALLY PROCESSABLE POLYURETHANES WITH IMPROVED SOFTENING PROPERTIES

(75) Inventors: Wolfgang Bräuer, Leverkusen (DE); Wolfgang Kaufhold, Köln (DE); Friedemann Müller, Neuss (DE); Jürgen Winkler, Langenfeld (DE); Herbert Heidingsfeld, Frechen (DE); Wolfgang Röhrig, Bergisch Gladbach (DE); Hans-Georg Hoppe, Leichlingen (DE)

(73) Assignee: Bayer Aktiengesellschaft, Leverkusen (DE)

( * ) Notice: Subject to any disclaimer, the term of this patent is extended or adjusted under 35 U.S.C. 154(b) by 341 days.

(21) Appl. No.: 09/572,225

(22) Filed: May 17, 2000

(65) Prior Publication Data

US 2002/0058777 A1 May 16, 2002

(30) Foreign Application Priority Data

May 26, 1999 (DE) .......................... 199 24 090

(51) Int. Cl.⁷ .................. C08G 18/32; C08G 18/42; C08G 18/44; C08G 18/48
(52) U.S. Cl. ............ 528/76; 264/176.1; 264/211.24; 264/328.1; 264/328.17; 366/279; 366/348; 528/80; 528/85
(58) Field of Search ................. 264/176.1, 211.24, 264/328.1, 328.17; 366/279, 348; 528/76, 80, 85

(56) References Cited

U.S. PATENT DOCUMENTS

| | | | |
|---|---|---|---|
| 3,642,964 A | 2/1972 | Rausch et al. | 264/40 |
| 3,963,679 A | 6/1976 | Ullrich et al. | 528/45 |
| 5,247,049 A | 9/1993 | Groll et al. | 128/73 |
| 5,545,707 A * | 8/1996 | Heidingsfeld et al. | 528/60 |
| 5,567,791 A * | 10/1996 | Br auer et al. | 528/52 |
| 5,795,948 A | 8/1998 | Heidingsfeld et al. | 528/59 |
| 5,905,133 A | 5/1999 | Müller et al. | 528/61 |
| 6,355,762 B1 * | 3/2002 | Kaufhold et al. | 528/76 |

FOREIGN PATENT DOCUMENTS

| | | |
|---|---|---|
| CA | 2178056 | 12/1996 |
| CA | 2246166 | 3/1999 |
| DE | 1964834 | 7/1971 |
| DE | 2823762 | 12/1978 |
| DE | 29 01 774 | 7/1980 |
| GB | 1057018 | 2/1967 |

OTHER PUBLICATIONS

Kunststoffe 68 1978, pp. 819–825, Goyert et al, Thomplastische Polyurethan–Elastomere–Eigenschaften und Anwendungen.

* cited by examiner

Primary Examiner—Rabon Sergent
(74) Attorney, Agent, or Firm—Joseph C. Gil; Aron Preis

(57) ABSTRACT

Process for the continuous preparation of thermoplastically processable polyurethane elastomers with improved softening properties is disclosed. The process is carried out in a tubular reactor at a ratio of the circumferential speed of the stirrer (in m/sec) in the tubular reactor and the throughput (in g/sec) of >0.03 m/g.

9 Claims, No Drawings

PROCESS FOR THE CONTINUOUS PREPARATION OF THERMOPLASTICALLY PROCESSABLE POLYURETHANES WITH IMPROVED SOFTENING PROPERTIES

The invention relates to a process for the continuous preparation of thermoplastically processable polyurethanes (with improved softening properties) in a tubular mixer.

Thermoplastic polyurethane elastomers have been known for a long time. They are of industrial importance because of the combination of high-quality mechanical properties with the known advantages of inexpensive thermoplastic processability. A wide range of variation in the mechanical properties can be achieved by using different chemical builder components. An overview of TPUs, their properties and uses is given e.g. in Kunststoffe 68 (1978), pages 819 to 825 or Kautschuk, Gummi, Kunststoffe 35 (1982), pages 568 to 584.

TPUs are built up from linear polyols, usually polyester polyols or polyether polyols, organic diisocyanates and short-chain diols (chain lengtheners). Catalysts can additionally be added to accelerate the formation reaction. The builder components can be varied within relatively wide molar ratios to adjust the properties. Molar ratios of polyols to chain lengtheners of 1:1 to 1:12 have proved appropriate. This results in products in the range from 70 Shore A to 75 Shore D.

Thermoplastically processable polyurethane elastomers can be built up either stepwise (prepolymer metering process) or by simultaneous reaction of all the components in one stage (one-shot metering process).

TPUs can be prepared continuously or discontinuously. The most widely known industrial preparation processes are the belt process (GB-A 1,057,018) and the extruder process (DE-A 19 64 834, DE-A 23 02 564 and DE-A 20 59 570). In the extruder process, the starting substances are metered into a screw reactor, the polyaddition reaction is carried out there and the product is converted into a uniform granule form. The extruder process is comparatively simple, but has the disadvantage that the homogeneity of the products prepared in this way is inadequate for many uses because the mixing and reaction proceed simultaneously. In addition, the softening properties of the TPUs and those of the shaped articles produced therefrom are limited. Low-melting TPUs, such as are employed e.g. for sintered products, can be prepared to only a limited extent, if at all, by this process.

Preparation processes in which the starting substances are first mixed in a mixing zone at temperatures at which no polyaddition occurs and are then reacted with one another in a reaction zone which has the desired reaction temperature are furthermore known from the prior art. The mixing and reaction zones are preferably constructed as a static mixer.

According to DE-A 28 23 762, homogeneous products are obtained by the one-shot process. According to EP-A 747 409, metering is carried out by the prepolymer process and homogeneous TPUs with improved mechanical properties are obtained.

The object was therefore to provide a simple process with which it is possible to prepare homogeneous TPUs with improved softening properties inexpensively and in an industrially simple manner.

Surprisingly, it has been possible to achieve this object by a procedure in which TPUs are prepared continuously under special process conditions in a stirred tubular reactor (tubular mixer) in which the entire TPU reaction is substantially carried out in the "one-shot metering process". Homogeneous TPU products with considerably better melting properties are obtained by this process.

The invention provides a one-shot metering process for the continuous preparation of thermoplastically processable homogeneous polyurethanes with improved softening properties, in which one or more diisocyanates (A) and a mixture (B), containing Zerewitinoff-active hydrogen atoms, of B1) 1 to 85 equivalent %, based on the isocyanate groups in (A), of one or more compounds having on average at least 1.8 and at most 2.2 Zerewitinoff-active hydrogen atoms per molecule and with an average molecular weight $\overline{M}_n$ of 450 g/mol to 5,000 g/mol, B2) 15 to 99 equivalent %, based on the isocyanate groups in (A), of one or more chain-lengthening agents having on average at least 1.8 and at most 2.2 Zerewitinoff-active hydrogen atoms per molecule and with a molecular weight of 60 g/mol to 400 g/mol, and 0 to 20 wt. %, based on the total amount of TPU, of further auxiliary substances and additives (C), components (A) and (B) being employed in an NCO:OH ratio of 0.9:1 to 1.1:1, are substantially reacted to completion in a tubular reactor stirred without positively controlled conveyance, characterized in that the ratio between the circumferential speed of the stirrer (m/sec) in the tubular reactor and the throughput (g/sec) exceeds 0.03 (m/g).

Suitable organic diisocyanates (A) include aliphatic, cycloaliphatic, araliphatic, heterocyclic and aromatic diisocyanates such as are described e.g. in Justus Liebigs Annalen der Chemie, 562, pages 75 to 136.

There may be mentioned specifically, by way of example: aliphatic diisocyanates, such as hexamethylene-diisocyanate, cycloaliphatic diisocyanates, such as isophorone-diisocyanate, 1,4-cyclohexane-diisocyanate, 1-methyl-2,4- and -2,6-cyclohexane-diisocyanate and the corresponding isomer mixtures and 4,4'-, 2,4'- and 2,2'-dicyclohexylmethane-diisocyanate and the corresponding isomer mixtures and aromatic diisocyanates, such as 2,4-toluylene-diisocyanate, mixtures of 2,4- and 2,6-toluylene-diisocyanate, 4,4'-diphenylmethane-diisocyanate, 2,4'-diphenylmethane-diisocyanate and 2,2'-diphenylmethane-diisocyanate, mixtures of 2,4'-diphenyl-methane-diisocyanate and 4,4'-diphenylmethane-diisocyanate, urethane-modified liquid 4,4'-diphenylmethane-diisocyanates and/or 2,4'-diphenylmethane-diisocyanates, 4,4'-diisocyanatodiphenyl-1,2-ethane and 1,5-naphthylene-diisocyanate. 1,6-Hexamethylene-diisocyanate, isophorone-diisocyanate, dicyclohexylmethane-diisocyanate, diphenylmethane-diisocyanate isomer mixtures with a 4,4'-diphenyl-methane-diisocyanate content of greater than 96 wt. % and, in particular, 4,4'-diphenylmethane-diisocyanate and 1,5-naphthylene-diisocyanate are preferably used. The diisocyanates mentioned can be used individually or in the form of mixtures with one another. They can also be used together with up to 15 wt. % (calculated for the total diisocyanate) of a polyisocyanate, but at most with an amount such that a thermoplastically processable product is formed. Examples are triphenylmethane-4,4',4"-triisocyanate and polyphenyl-polymethylene-polyisocyanates.

Linear polyols with hydroxyl end groups, on average 1.8 to 3.0, preferably to 2.2 Zerewitinoff-active hydrogen atoms per molecule and with a number average molecular weight of 450 to 5,000 are preferably employed as component B1). Because of the production, these often contain small amounts of non-linear compounds. They are therefore often referred to as "substantially linear polyols". Polyester diols, polyether diols, polycarbonate diols or mixture of these are preferred.

Suitable polyether diols can be prepared by reacting one or more alkylene oxides having 2 to 4 carbon atoms in the alkylene radical with a starter molecule which contains two bonded active hydrogen atoms. Alkylene oxides which may be mentioned are e.g.: ethylene oxide, 1,2-propylene oxide, epichlorohydrin and 1,2-butylene oxide and 2,3-butylene oxide. Ethylene oxide, propylene oxide and mixtures of 1,2-propylene oxide and ethylene oxide are preferably used. The alkylene oxides can be used individually, alternately in succession or as mixtures.

Possible starter molecules are, for example: water, amino-alcohols, such as N-alkyl-diethanolamines, for example N-methyl-diethanolamine, and diols, such as ethylene glycol, 1,3-propylene glycol, 1,4-butanediol and 1,6-hexanediol. Mixtures of starter molecules can optionally also be employed. Suitable polyether-ols are furthermore the polymerization products of tetrahydrofuran which contain hydroxyl groups. It is also possible to employ trifunctional polyethers in amounts of 0 to 30 wt. %, based on the bifunctional polyethers, but at most in an amount such that a thermoplastically processable product is formed. The substantially linear polyether diols preferably have molecular weights of 450 to 5,000. They can be used both individually and in the form of mixtures with one another.

Suitable polyester diols can be prepared, for example, from dicarboxylic acids having 2 to 12 carbon atoms, preferably 4 to 6 carbon atoms, and polyhydric alcohols. Possible dicarboxylic acids are, for example: aliphatic dicarboxylic acids, such as succinic acid, glutaric acid, adipic acid, suberic acid, azelaic acid and sebacic acid, and aromatic dicarboxylic acids, such as phthalic acid, isophthalic acid and terephthalic acid. The dicarboxylic acids can be used individually or as mixtures, e.g. in the form of a succinic, glutaric and adipic acid mixture. To prepare the polyester diols it may optionally be advantageous to use the corresponding dicarboxylic acid derivative instead of the dicarboxylic acids, such as carboxylic acid diesters having 1 to 4 carbon atoms in the alcohol radical, carboxylic acid anhydrides or carboxylic acid chlorides. Examples of polyhydric alcohols are glycols having 2 to 10, preferably 2 to 6 carbon atoms, such as ethylene glycol, diethylene glycol, 1,4-butanediol, 1,5-pentanediol, 1,6-hexanediol, 1,10-decanediol, 2,2-dimethyl-1,3-propanediol, 1,3-propanediol and dipropylene glycol. The polyhydric alcohols can be used by themselves or optionally in a mixture with one another, depending on the desired properties. Compounds which are furthermore suitable are esters of carbonic acid with the diols mentioned, in particular those having 4 to 6 carbon atoms, such as 1,4-butanediol and/or 1,6-hexanediol, condensation products of ω-hydroxycarboxylic acids, for example ω-hydroxycaproic acid, and preferably polymerization products of lactones, for example optionally substituted ω-caprolactones. Polyester diols which are preferably used are ethanediol polyadipates, 1,4-butanediol polyadipates, ethane-diol-1,4-butanediol polyadipates, 1,6-hexanediol-neopentylglycol polyadipates, 1,6-hexanediol-1,4-butanediol polyadipates and polycaprolactones. The polyester diols have average molecular weights of 450 to 5,000 and can be used individually or in the form of mixtures with one another.

Diols or diamines having on average 1.8 to 3.0, preferably to 2.2 Zerewitinoff-active hydrogen atoms per molecule and with an average molecular weight of 60 to 400 are preferably employed as component B2), preferably aliphatic diols having 2 to 14 carbon atoms, such as e.g. ethanediol, 1,6-hexanediol, diethylene glycol, dipropylene glycol and in particular 1,4-butanediol. However, diesters of terephthalic acid with glycols having 2 to 4 carbon atoms, such as e.g. terephthalic acid bis-ethylene glycol or terephthalic acid bis-1,4-butanediol, hydroxyalkylene ethers of hydroquinone, such as e.g. 1,4-di(β-hydroxyethyl)-hydroquinone, ethoxylated bisphenols, such as e.g. 1,4-di (β-hydroxyethyl)-bisphenol A, (cyclo)aliphatic diamines, such as e.g. isophoronediamine, ethylenediamine, 1,2-propylene-diamine, 1,3-propylene-diamine and N-methyl-propylene-1,3-diamine, N,N'-dimethyl-ethylenediamine, and aromatic diamines, such as e.g. 2,4-toluylene-diamine and 2,6-toluylene-diamine, 3,5-diethyl-2,4-toluylene-diamine and/or 3,5-diethyl-2,6-toluylene-diamine, and primary mono-, di-, tri- and/or tetraalkyl-substituted 4,4'-diaminodiphenylmethanes are also suitable. It is also possible to employ mixtures of the abovementioned chain lengtheners. In addition, relatively small amounts of triols can also be added.

Small amounts of conventional monofunctional compounds can furthermore also be employed, e.g. as chain stoppers or mould release aids. Examples which may be mentioned are alcohols, such as octanol and stearyl alcohol, or amines, such as butylamine and stearylamine.

To prepare the TPUs, the builder components, optionally in the presence of catalysts, auxiliaries and/or additives, are preferably reacted in amounts such that the ratio of equivalents of NCO groups A) to the sum of the NCO-reactive groups, in particular the OH groups of the low molecular weight diols/triols B2) and polyols B1), is 0.9:1.0 to 1.1:1.0, preferably 0.95:1.0 to 1.10:1.0.

Suitable catalysts according to the invention are the conventional tertiary amines known from the prior art, such as e.g. triethylamine, dimethylcyclohexylamine, N-methylmorpholine, N,N'-dimethyl-piperazine, 2-(dimethylamine-ethoxy)-ethanol, diazabicyclo-(2,2,2)-octane and the like, and in particular organometallic compounds, such as titanic acid esters, iron compounds and tin compounds, e.g. tin diacetate, tin dioctoate, tin dilaurate or the tin-dialkyl salts of aliphatic carboxylic acids, such as dibutyltin diacetate, dibutyltin dilaurate or the like. Preferred catalysts are organometallic compounds, in particular titanic acid esters and iron compounds and/or tin compounds.

In addition to the TPU components and the catalysts, auxiliaries and/or additives C) can also be added in an amount of up to 20 wt. %, based on the total amount of TPU. They can be predissolved in one of the TPU components, preferably in component B1), or also optionally metered into a mixing unit, such as e.g. an extruder, downstream of the stirred reactor after the reaction has taken place. Examples which may be mentioned are lubricants, such as fatty acid esters, metal soaps thereof, fatty acid amides, fatty acid ester-amides and silicone compounds, antiblocking agents, inhibitors, stabilizers against hydrolysis, light, heat and discoloration, flameproofing agents, dyestuffs, pigments, inorganic and/or organic fillers and reinforcing agents. Reinforcing agents are, in particular, fibrous reinforcing substances, such as e.g. inorganic fibres, which can be prepared according to the prior art and can also be charged with a size. Further details on the auxiliary substances and additives mentioned are to be found in the technical literature, for example the monograph by J. H. Saunders and K. C. Frisch "High Polymers", Volume XVI, Polyurethane, Part 1 and 2, Verlag Interscience Publishers 1962 and 1964, the Taschenbuch für Kunststoff-Additive by R. Gächter and H. Müller (Hanser Verlag Munich 1990) or DE-A-29 01 774.

Further additives which can be incorporated into the TPU are thermoplastics, for example polycarbonates and acrylonitrile/butadiene/styrene terpolymers, in particular ABS. Other elastomers, such as rubber, ethylene/vinyl acetate copolymers, styrene/butadiene copolymers and other TPUs, can also be used. Commercially available plasticizers, such as phosphates, phthalates, adipates, sebacates and alkylsulfonic acid esters, are furthermore suitable for incorporation.

The preparation process according to the invention is preferably carried out as follows:

Components A) and B) are heated separately from one another, preferably in a heat exchanger, to a temperature of between 50° and 220° C. and are metered simultaneously and continuously in liquid form into a tube (tubular mixer) which is stirred without positively controlled conveyance and has a length/diameter ratio of 1:1 to 50:1, preferably 2:1 to 20:1.

The stirrer mixes the components at a speed of preferably 200 to 5,000 rpm. According to the invention, the speed of the stirrer is adjusted such that the ratio between the circumferential speed of the stirrer diameter in m/sec and the throughput (sum of the meterings of components A)+B) and the optional C)) in g/sec exceeds the value 0.03 m/g. A value of greater than 0.06 m/g is preferred.

The stirrer is a preferably monoaxially rotating mechanical stirrer without positively controlled conveyance. It is possible to use e.g. beams, rods, anchors, grids, blades or propellers as the mixing elements.

According to the invention, the TPU build-up reaction is brought substantially to complete conversion, i.e. >90%, based on the starting component A), in the stirred tubular reactor (tubular mixer). The residence time required for this is 2 sec to 5 min, depending on the throughput, the raw materials employed, the reaction temperatures and the catalyst. For economic reasons, the conditions mentioned are preferably adjusted to a residence time in the tubular mixer of 5 to 60 sec.

The reaction temperatures here reach values of 140° to 300° C., preferably above 220° C., depending on the starting temperature of the starting components.

The reaction mixture is discharged continuously from the tubular mixer. It can be deposited directly on a carrier. After heat treatment at temperatures of 60 to 180° C. and subsequent cooling, the TPU composition can be granulated. In a continuous preparation process, the carrier is a continuously transporting conveyor belt.

In a particular variant according to the invention, the tubular mixer reaction mixture is metered directly into a continuously operating kneader and/or extruder (e.g. a twin-shaft kneader ZSK), where additional auxiliary substances can be mixed into the TPU at temperatures of 120 to 250° C. At the end of the extruder, the composition is likewise granulated.

The TPU prepared by the process according to the invention can be processed to injection-moulded articles, extruded articles, in particular to melt films, to coating compositions or sintering types, and to low-melting coextrusion types, such as e.g. laminations, calenderings and powder-slush types. With a good homogeneity, it is distinguished above all by a low softening temperature, as are also the shaped articles produced therefrom.

The invention is explained in more detail with the aid of the following examples.

EXAMPLES

Examples 1 to 5

| TPU recipe for examples 1 to 5: | |
|---|---|
| Poly-butane-1,4-diol adipate (molecular weight approx. 820) | 54 parts by wt. |
| Butane-1,4-diol | 7.4 parts by wt. |
| 4,4'-Diphenylmethane-diisocyanate | 37 parts by wt. |
| Ethylene-bis-stearylamide | 0.2 parts by wt. |
| Tin dioctoate | 200 ppm |

Example 1

ZSK process not according to the invention
(comparison example)

The polyester, in which 200 ppm (based on the polyester) tin dioctoate were dissolved as a catalyst, was heated to 145° C. with the butanediol and the mixture was metered continuously into the first housing of a ZSK 83 (Werner/Pfleiderer). 4,4'-Diphenylmethane-diisocyanate (130° C.) and ethylene-bis-stearylamide were metered into the same housing. The first 9 housings of the ZSK were not heated (quasi-adiabatic). Temperatures of up to 240° C. were reached due to the heat of reaction released. The last 4 housings were cooled. The speed of rotation of the screw was 270 rpm and the throughput was 10,000 g/min.

At the end of the screw, the hot melt was taken off as a strand, cooled in a water-bath and granulated.

The results of the particular product testing are given in the table.

Example 2

Tubular mixer ZSK process

The above polyester/butanediol mixture was metered continuously with the tin dioctoate into the lower end of a tubular mixer. At the same time, the 4,4'-diphenylmethane-diisocyanate (130° C.) was pumped continuously into the adjacent feed point at the lower end of the tubular mixer. The throughput was 9,000 g/min. The tubular mixer, heated at 240° C., had a diameter of 7 cm and a length/diameter ratio of 7:1. The stirrer, fitted with rods, of the tubular mixer was rotated at 1,800 rpm. The TPU formed was discharged at the upper end of the tubular mixer and metered directly into the first feed point (housing 1) of a ZSK 83. The ethylene-bis-stearylamide was metered into the same housing. The ZSK parameters were adjusted analogously to example 1. The quasi-adiabatic housing temperature adjustment showed that heat of reaction was no longer released in the ZSK.

At the end of the screw, the hot melt was taken off as a strand, cooled in a water-bath and granulated.

Examples 3–5

Extruder-free tubular mixer process

This process was carried out analogously to example 2. An unheated tubular mixer with a diameter of 4.2 cm and a length/diameter ratio of 2.7 was used. The throughput was 520 g/min and the speed of the stirrer was 500, 1,000 or 3,000 rpm.

The polyester/butanediol mixture was heated to 170° C. and the 4,4'-diphenylmethane-diisocyanate was heated to 80° C.

The conversion at the end of the tubular mixer was 99 equivalent %, based on the 4,4'-diphenylmethane-diisocyanate.

The TPU was metered continuously on to a coated metal carrier, after-heated at 110° C. for 30 min and granulated.

Blown Film Production from the TPUs of Examples 1–5

The particular TPU granules were melted in a single-screw extruder 30/25D Plasticorder PL 2000-6 from Brabender (metering 3 kg/h; 185–205° C.) and extruded through a film blowing die to a tubular film.

Production of Injection-Moulded Articles from the TPUs of Examples 1-5

The particular TPU granules were melted in an injection moulding machine D 60 (32 screw) from Mannesmann (melt temperature approx. 225° C.) and shaped to sheets (125 mm×50 mm×2 mm).

Dynamic/Mechanical Analysis (DMA) Over Temperature

For each of the products, a dynamic/mechanical measurement was carried out on a test specimen (50 mm×12 mm×2 mm) stamped out of the injection-moulded sheet in a torsion pendulum test over temperature analogously to DIN 53445.

The measurements were made with the RDA 700 from Rheometrics with 1 Hz in the temperature range from −125° C. to 200° C. with a heating-up rate of 1° C./min.

To characterize the softening properties according to the invention, the temperature at which the memory modulus G' reaches the value of 1 MPa (the softening temperature) is stated in the following table.

Mechanical Testing at Room Temperature

The modulus at 100% elongation was measured on the injection-moulded test specimens in accordance with DIN 53405.

Results

| Example | Reactor | Residence time (sec) | Stirrer speed (rpm) | Circumferential speed/through-put (m/g) | 100% modulus (MPa) | Softening temperature DMA (° C.) |
|---|---|---|---|---|---|---|
| 1* | ZSK | 30 | 270 | 0.01 | 10.3 | 152 |
| 2 | tubular mixer | 10 | 1800 | 0.04 | 9.9 | 149 |
| 3 | tubular mixer | 15 | 500 | 0.13 | 10.1 | 135 |
| 4 | tubular mixer | 15 | 1000 | 0.25 | 9.8 | 136 |
| 5 | tubular mixer | 15 | 3000 | 0.76 | 10.3 | 129 |

*comparison example not according to the invention

Homogeneous blown films were obtained from all the products.

The products produced by the tubular mixer process according to the invention have a considerably reduced softening temperature compared with the product produced by the normal ZSK process, with the same mechanical properties at room temperature and an equally good film homogeneity.

These melting properties are advantageous in particular for the TPU melt film and sintering sector.

what is claimed is:

1. A continuous process for the preparation of thermoplastic, homogeneous polyurethane having improved softening properties comprising reacting substantially to completion, in a tubular reactor equipped with a stirrer at least one diisocyanate (A) with a mixture (B) containing
    B1) 1 to 85 equivalent %, based on the isocyanate groups in (A) of at least one compound having on average at least 1.8 and at most 2.2 Zerewitinoff-active hydrogen atoms per molecule and a number average molecular weight of 450 to 5000 glmol, and
    B2) 15 to 99 equivalent %, based on the isocyanate groups in (A) of at least one chain lengthening agent having on average at least 1.8 and at most 2.2 Zerewitinoff-active hydrogen atoms per molecule and a molecular weight of 60 to 400 g/mol, wherein (A) and (B) are employed in an NCO:OH ratio of 0.9:1 to 1.1:1, said tubular reactor characterized in the absence of positively controlled conveyance therefrom and in that the ratio between the circumferential speed of said stirrer expressed in terms of meter/second and the throughput expressed in terms of g/second is greater than 0.03 meter/g, said reacting substantially to completion amounting to conversion greater than 90%, based on starting component (A) the said absence of positively controlled conveyance restricting said stirrer to a monoaxially rotating stirrer having as mixing elements a member selected from the group consisting of beams, rods, anchors, grids, blades and propellers.

2. The process of claim 1, characterized in that the compound B1) is at least one member selected from the group consisting of polyesterdiol, polyetherdiol, and polycarbonatediol.

3. The process according to claim 1, characterized in that the compound B2) is at least one member selected from the group consisting of ethylene glycol, butanediol, hexanediol, 1,4-di-(β-hydroxyethyl)-hydroquinone and 1,4-di-(β-hydroxyethy)bisphenol A.

4. The process according to claim 1, characterized in that the diisocyanate A) is at least one member selected from the group consisting of 1,6-hexamethylene-diisocyanate, isophorone-diisocyanate, dicyclohexylmethane-diisocyanate and a diphenylmethane-diisocyanate, isomer mixture with a 4,4'-diphenyl-methane-diisocyanate content greater than 96 wt. %.

5. The process according to claim 1 characterized in that the reaction mixture prepared in the tubular reactor is metered into an extruder and at least one auxiliary substance selected from the group consisting of lubricant, antiblocking agent, hydrolysis stabilizer, light stabilizer, heat stabilizer, discoloration stabilizer, flameproofing agent, dyestuff, pigment, inorganic fillers, organic fillers and reinforcing agents are optionally mixed therewith.

6. The process according to claim 1, characterized in that the TPU-forming components A), B1) and B2) are brought to a conversion of >90%, based on the starting component A), in said stirred tubular reactor in the course of 60 seconds.

7. The thermoplastic polyurethane prepared by the process of claim 1.

8. An article molded by injection comprising the thermoplastic polyurethane of claim 7.

9. An extruded article comprising the thermoplastic polyurethane of claim 7.

* * * * *